United States Patent [19]

Linden

[11] 3,718,507

[45] Feb. 27, 1973

[54] BI-CELL UNIT FOR FUEL CELL
[75] Inventor: David Linden, Little Silver, N.J.
[73] Assignee: The United States of America as represented by the Secretary of the Army
[22] Filed: March 24, 1971
[21] Appl. No.: 127,486

[52] U.S. Cl. .............................................. 136/86 R
[51] Int. Cl. ..................... H01m 27/30, H01m 29/02
[58] Field of Search ......................................... 136/86

[56] References Cited

UNITED STATES PATENTS

| 3,554,803 | 1/1971 | Poirier | 136/86 R |
| 3,266,937 | 8/1966 | Lyons, Jr. | 136/86 R |
| 3,297,484 | 1/1967 | Niedrach | 136/86 D |
| 3,419,900 | 12/1968 | Elmore et al. | 136/86 D |
| 3,595,698 | 7/1971 | Kordesch | 136/86 F |

FOREIGN PATENTS OR APPLICATIONS 971,454  9/1964  Great Britain ...................... 136/86 E

OTHER PUBLICATIONS

U.S. Govt. R & D Reports, Vol. 69, No. 14, pg. 84, "Simplified Hydrazine–Air Fuel Cell" 7/1969.

Primary Examiner—Allen B. Curtis
Attorney—Harry M. Saragovitz, Edward J. Kelly, Herbert Berl and Roy E. Gordon

[57] ABSTRACT

A bi-cell unit is provided for a fuel cell. The bi-cell unit is comprised of two electrode packs. Each of the electrode packs includes an anode, an air cathode, and a separator between the anode and the cathode. The two packs are assembled together with the anodes spaced apart and facing each other, the space between the anodes defining an anolyte chamber through which a liquid mixture of fuel and electrolyte is circulated.

This invention relates in general to a bi-cell unit for a fuel cell and in particular, to a bi-cell unit for a hydrazine-air fuel cell.

1 Claim, 2 Drawing Figures

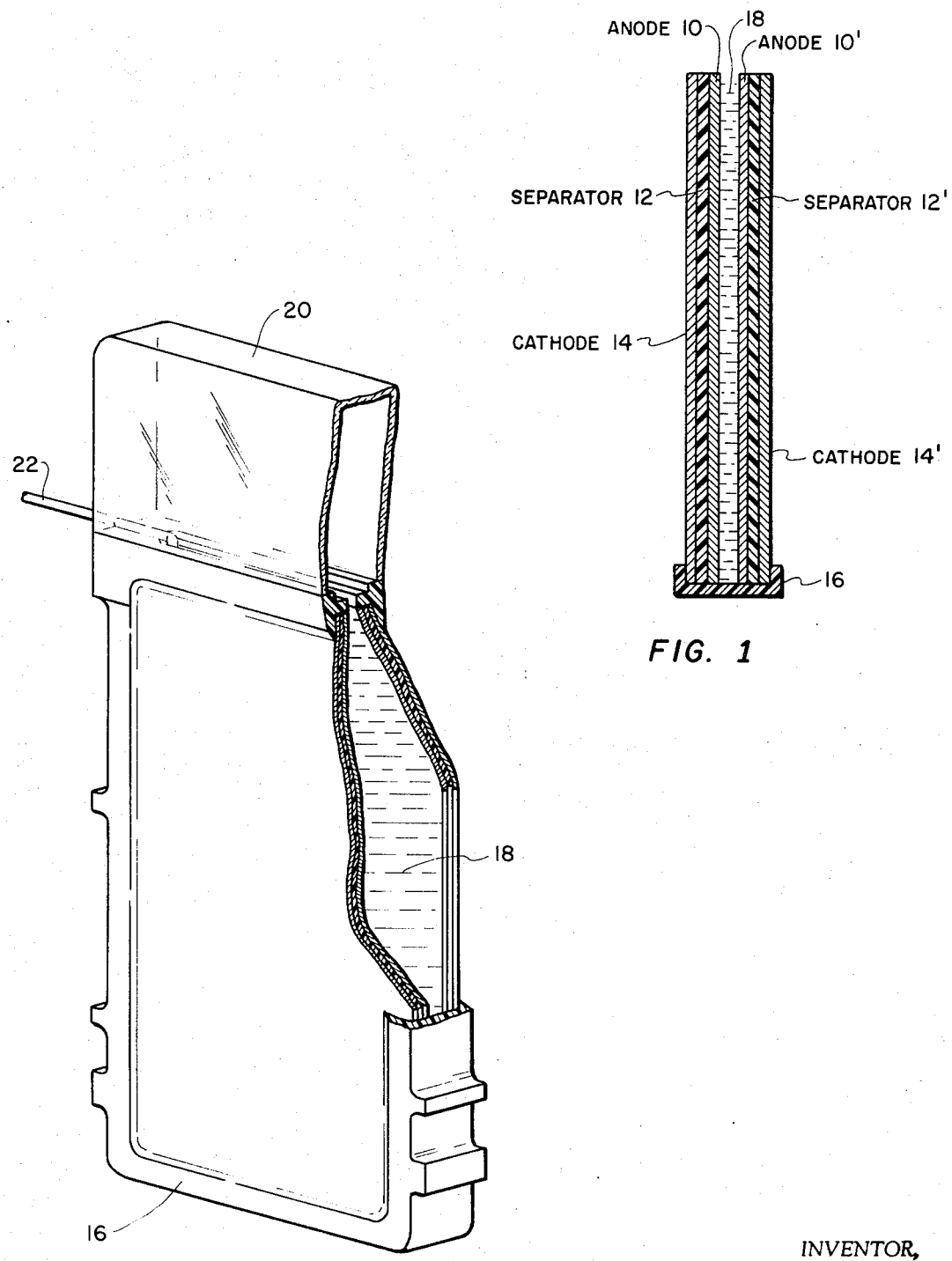

BI-CELL UNIT FOR FUEL CELL

BACKGROUND OF THE INVENTION

The use of a bi-cell unit in a fuel cell such as the hydrazine-air cell and in other batteries such as the zinc-air battery is known. Such a bi-cell unit is comprised of a single anode centrally positioned between two air cathodes with separating material between the cathodes and each side of the anode surface. One of the difficulties with such a bi-cell unit especially when used in a hydrazine-air cell is the relatively high resistive path between the anode and cathode members. A further difficulty is the loss of hydrazine due to its oxidation at the cathode.

SUMMARY OF THE INVENTION

The general object of this invention is to provide a bi-cell unit for a fuel cell. A further object of the invention is to provide a bi-cell unit for a hydrazine-air fuel cell in which the aforementioned difficulties are overcome. A still further object of the invention is to provide a bi-cell unit for a hydrazine-air fuel cell in which the internal resistance is minimized and in which there is such a separation of hydrazine from the air cathode surface that the oxidation of hydrazine at the cathode is minimized.

The bi-cell unit of the invention is comprised of two electrode packs. Each of the electrode packs includes an anode, an air cathode, and a separator between the anode and air cathode. The two packs are assembled together with the anodes spaced apart and facing each other, the space between the anodes defining an anolyte chamber through which a liquid mixture of fuel and electrolyte is circulated.

DESCRIPTION OF THE DRAWING AND THE PREFERRED EMBODIMENT

The invention can best be understood by referring to the accompanying drawing wherein:

FIG. 1 is a cross section of the bi-cell unit; and

FIG. 2, partially in cross section, shows the bi-cell unit as incorporated in a fuel cell battery.

Referring now to FIGS. 1 and 2 the bi-cell unit includes two electrode packs. Each electrode pack contains a cathode 14 and 14' respectively, an asbestos type separator 12 and 12' respectively, and an anode 10 and 10' respectively; each of the cathodes, separators, and anodes being cemented together around the outer edges to form the respective packs. By this arrangement, the respective anodes and cathodes of each pack are brought into close proximity. The packs are then assembled together within a plastic frame holder 16 and with anodes 10 and 10' facing; the space between the anodes defining an anolyte chamber 18.

As shown, the bi-cell unit includes the two electrode packs with the built-in anolyte chamber cemented within the plastic frame holder 16. A fuel feed tube 22 is positioned along the upper edge of the electrode packs to feed liquid fuel into the anolyte chamber 18. An anolyte overflow reservoir 20 is mechanically connected to the top edge of the bi-cell unit.

The above construction separates the fuel as for example, hydrazine, from the cathode surface. This reduces the internal resistance of the cell and minimizes the possibility of hydrazine reducing the cathode.

As the cathode, any air cell electrode may be used provided that it has been properly wetproofed. A particularly desirable cathode may be prepared by platinizing a silver screen using Teflon and carbon with the platinum. Similarly, any fuel cell anode may be used. A particularly desirable anode is prepared by impregnating thin, porous sintered nickel plaques with palladium catalyst when hydrazine is used as the fuel.

The separator between the anode and cathode is not critical. That is, instead of the asbestos shown above, one might use a mechanical plastic spacer, filter paper, a membrane barrier, etc.

Any liquid fuel amenable to reduction can be fed into the bi-cell unit. Thus, the invention contemplates the use of liquid fuels such as methanol, hydrazine, and liquid hydrocarbons.

Though the preferred embodiment described above discloses the use of an alkaline electrolyte with hydrazine as the fuel, other type electrolytes are contemplated by the invention. For example if one uses a liquid hydrocarbon as the fuel, an acidic electrolyte might be preferred.

Each component of the bi-cell unit, that is anode, separator, or cathode is conveniently about 10 to 100 mils in thickness, but it is to be understood that the component thickness will be dependent on the particular application. That is, a low rate design would have thicker components whereas a high rate design would have thinner components. The anolyte chamber itself is not limited as to its thickness.

When the bi-cell unit of the invention is discharged under similar conditions to that of the single anode designs, that is, at current densities of about 50 milliamperes per square centimeter, an increase in output voltage of at least 25 percent is realized. At even high current densities as for example, 100 milliamperes per square centimeter, the new design is able to support a current whereas the single anode structure will fall below a useful end voltage.

The foregoing description is to be considered merely as illustrative and not in limitation thereof.

What is claimed is:

1. As a bi-cell unit for a fuel cell, a first and second electrode pack, each of said electrode packs comprising a sintered nickel grid impregnated with palladium catalyst as the anode, a platinized and waterproofed silver screen as the air cathode, and a separator between the anode and air cathode, the two packs being assembled together with the anodes spaced apart and facing each other, the space between the anodes defining an anolyte chamber through which a solution of hydrazine in aqueous potassium hydroxide is circulated.

* * * * *